I. C. Saunders. Device for Sharpening Harvester Knives.
No. 122,064.  Fig. 1.  Patented Dec. 19, 1871.
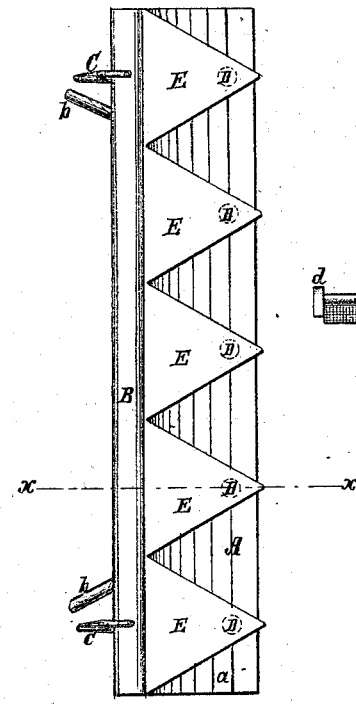
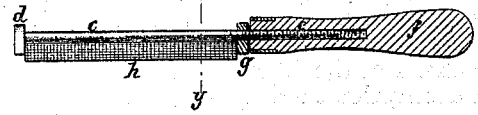
Fig. 3.
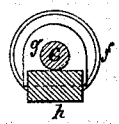
Fig. 4.
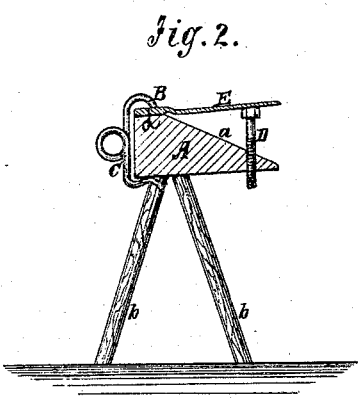
Fig. 2.
Witnesses:
A. Bennerkendorf
Wm. H. C. Smith.
Inventor:
I. C. Saunders.
per
Attorneys.

N°. 122,064

UNITED STATES PATENT OFFICE.

ISAAC C. SAUNDERS, OF TRENTON, MICHIGAN.

IMPROVEMENT IN APPARATUS FOR SHARPENING HARVESTER-KNIVES.

Specification forming part of Letters Patent No. 122,064, dated December 19, 1871.

*To all whom it may concern:*

Be it known that I, ISAAC C. SAUNDERS, of Trenton, in the county of Wayne and State of Michigan, have invented a new and useful Device for Sharpening the Knives of Harvesters; and I do hereby declare that the following is a full, clear, and exact description thereof, which will enable others skilled in the art to make and use the same, reference being had to the accompanying drawing forming part of this specification.

Figure 1 is a plan view of my improvement. Fig. 2 represents a cross-sectional elevation of the same through the line $x$ $x$ in Fig. 1. Fig. 3 is a sectional elevation of my sharpener-holder, showing the whetstone in position for use. Fig. 4 is a cross-section of the same through the line $y$ $y$ in Fig. 3.

Similar letters of reference indicate corresponding parts.

My invention consists in improving devices for sharpening harvester-knives without removing them from the cutter-bar, as hereinafter fully described and subsequently pointed out in the claim.

In the drawing, A represents a bench for the support of the cutter-bar and harvester-knives during the operation of sharpening. The bench, mounted on legs $b$ and made of wood or other suitable material, has a beveled face, $a$, with the exception of the rear part, which is flat, on which flat portion the cutter-bar B of the harvester rests. The cutter-bar B is held in position upon the bench A by two or more self-adjusting spring-clamps, C, which grasp the under side of the bench and the upper surface of the cutter-bar, as shown. The clamps may be made in any other suitable form and of any suitable metal. E represents the knives, attached to the cutter-bar B. When the cutter-bar B is laid on the bench and secured by the clamps, as described, the knives E project out horizontally over the beveled surface of the bench, and the front ends of the knives are supported upon adjustable rests or posts D, which rise from the beveled portion of the bench, as shown. In this position the knives of the cutter-bar B are ready to be sharpened, the beveling down of the bench at $a$ giving ample room for the sharpening device to pass below the cutters. The rests or posts D are adjustable, so that they can be accommodated to the varying sizes of knives. The posts or rests D here represented are provided with screw-threads upon their lower parts, so that when turned their height is adjusted; and they may also be shifted to any desired position on the bench. The sharpener-holder, as shown in Fig. 3, is composed of the following parts: $c$ is a rod, of any suitable material, having attached at one end a clip or projection, $d$, and at the other a screw-thread, $e$, which works in a nut within the handle $f$; or the nut may be placed in the ferrule of the handle. $g$ is a loose clip, which slides on the rod $c$; and the stone or other sharpener $h$ is secured and clamped between the two clips $d$ and $g$, as shown.

The manner of securing the sharpening-stone or other sharpener is by placing it on the rod $c$, between the two clips $d$ and $g$, and then turning the handle $f$, which, working with its nut on the screw-thread of rod $c$, causes the two clips $d$ and $g$ to approach each other and tighten against the ends of the sharpening-stone $h$, which is thereby firmly clamped and secured.

When short stones are to be used I provide two handles, one at each end of the rod $c$, and am able thereby to use two different kinds of stones—one fine and one coarse—in the same holder. In other cases I elongate the clips or make them in the form of disks, so as to clamp two or more stones upon one handle. Instead of stones any other suitable sharpening device may be used, such as the ordinary rifle-wood, covered with emery or metal-sharpeners.

In using my improvements, the cutter-bar having been secured upon the bench, as before described, the operator stands behind the bench and passes the sharpening device downward, at the proper angle, upon the edges of the cutters, the beveled form of the bench affording room for that purpose, the front ends of the cutters being firmly supported during the sharpening operation by the posts or rests D, before described.

I do not limit or confine myself to the exact form of any of the parts herein described, as these may be varied without departing from my invention.

Having thus described my invention, I claim as new and desire to secure by Letters Patent—

The bench A $a$ $d$, spring-clamps C C, and rests D D, when all are combined to hold the cutter-bar and to allow the sharpener to be operated, in the manner described.

ISAAC C. SAUNDERS.

Witnesses:
A. BOSTWICK,
JONATHAN HUDSON.

(74)